United States Patent [19]
Beelen

[11] 3,817,568
[45] June 18, 1974

[54] FRONT OR BACK PANEL FOR MOTORBUSES, AND SHAPED BAR USED IN SUCH PANEL

[75] Inventor: Hilaire Beelen, Kehlen, Luxembourg

[73] Assignee: Sebia S.A. Holding, Luxembourg, Luxembourg

[22] Filed: July 25, 1972

[21] Appl. No.: 274,887

[30] Foreign Application Priority Data
Jan. 24, 1972 Luxembourg.......................... 64852

[52] U.S. Cl. .............................. 296/28 A, 296/84 R
[51] Int. Cl............................................. B62d 25/08
[58] Field of Search..... 296/28 A, 28 C, 28 K, 84 R

[56] References Cited
UNITED STATES PATENTS
2,039,215  4/1936  Fageol ........................... 296/28 A
2,196,939  4/1940  Perkins ........................... 296/28 A
2,356,690  8/1944  Perkins ........................... 296/28 A FOREIGN PATENTS OR APPLICATIONS
1,227,134  2/1960  France............................ 296/28 A Primary Examiner—Leo Friaglia
Assistant Examiner—John A. Pekar
Attorney, Agent, or Firm—Richards and Geier

[57] ABSTRACT

The invention pertains to a front or back panel for motorbuses, having an arcuate framework, the vertical edges of which are constituted each by a shaped bar designed for imparting great strength to said panel, said bar serving as an upright of the body of the motorbus during the assembly of the latter.

2 Claims, 10 Drawing Figures

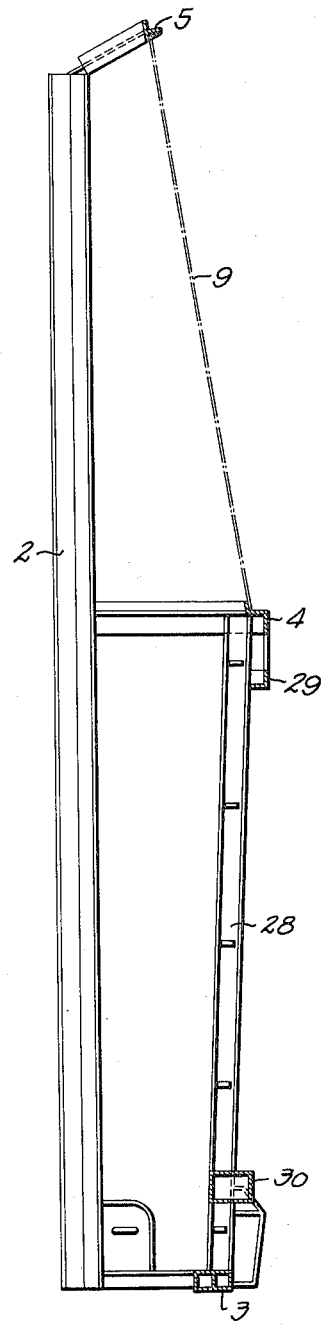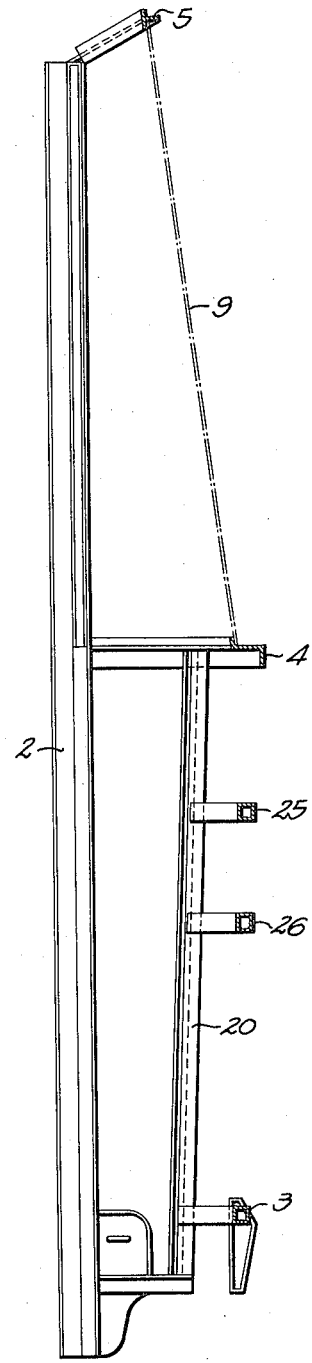

FRONT OR BACK PANEL FOR MOTORBUSES, AND SHAPED BAR USED IN SUCH PANEL

The present invention relates to a front or back panel for motor coaches or buses, and to a shaped part for use as a bracing or framing edge bar thereof.

As is well-known in the art, the front and back panels of a motor-bus generally are integral parts of the overall body or skeleton of the bus, said panels being set up together with the lateral structures, whereafter they are fitted, simultaneously with the side parts of the skeleton, with glass panes and other accessory parts, as usual.

It has however appeared that in constructing such motorbuses it is very advantageous to manufacture separate front and/or back panels, the latter then being mounted as a whole onto the respective ends of the lateral structures and secured in that position e.g. by welding.

In fact, such a procedure permits mass-production of front and back panels provided with the necessary openings for mounting the lighting and signalling units etc. and possibly the wind shield and the rear window, respectively, and adapted for being readily fitted and secured to the main part of the body; this is particularly advantageous, in view of the ever increasing tendency of using front and back panels of similar shape and dimensions, not only on account of unified manufacture, but also on account of the fact that the use of such separate panel units will be instrumental in appreciably shortening the total construction time of a motorbus, as it permits the different parts to be assembled simultaneously at different locations, said parts being then joined and correctly secured one to the other, in order to achieve the final product.

Of course, successful use of such mounting methods will depend on the fulfilment of particular requirements in order to ensure perfect adaptation and a flawless fit of said panels on said main body.

To this effect such panels are assembled in welding jigs and are provided, at each of their vertical edges, with a bracing edge bar specially shaped with a view to permitting said panels to be mounted on the main body of the bus without particular adapting means, said shaped edge bars being so designed as to impart great strength and rigidity to said panels, before as well as after the mounting, this being beneficial in view of the handling of said panels before mounting, as well as ensuring the strength and solidity of the body of the motor bus in actual use.

Though in the present specification reference is made to a set comprising a front and back panel, it will be understood that the invention equally concerns such front panels and such back panels, taken separately.

The panel according to the invention substantially comprises an arcuate framework, the free vertical edges of which are constituted each by a shaped bar designed for imparting great strength to said panel, said bar being suitable for use as an upright of the body of the motorbus during the assembly of the latter.

In order that the invention and the characteristic features thereof be more readily understood, without limiting the scope of the invention a preferred embodiment of a front panel and a back panel will be described more in detail hereinafter, with reference to the accompanying drawings, in which:

FIG. 3 is a sectional view according to the line III—III in FIG. 2;

FIG. 5 is a sectional view according to the line V—V in FIG. 4;

In the example shown the main dimensions of the front and back panels have been assumed to be the same, though the disposition of the constituent parts is different on account of the fact, that one of said panels, in this case the back panel, covers the engine.

It should be observed though, that according to the invention said front panel and said back panel are not necessarily the same, but said panels may be different in shape and in dimensions, or in this that one of said panels is manufactured separately as according to the invention, whereas the other is made as a part of the main body of the motorbus.

According to the invention each of said panels is simply comprised of two shaped edge bars, 1-2, adapted for mounting on the corresponding parts of the motorbus body, generally to be welded thereon, said edge bars being interconnected, generally at the bottom, in the middle and at the top, by three transverse shaped bars 3, 4 and 5, the latter being adapted to the shape of the edge of the vehicle's roofing.

Figure 6:
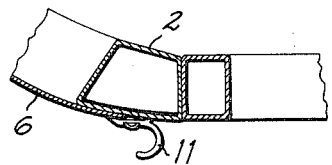
FIG. 6 is a sectional view according to the line VI—VI in FIG. 1.
Figure 7:
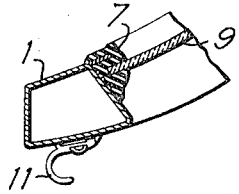
FIG. 7 is a sectional view according to the line VII—VII in FIG. 1.
Figure 10:
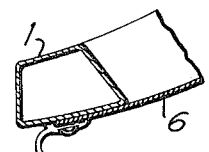
FIG. 10 is a sectional view according to the line X—X in FIG. 1.

As appears more particularly from FIG. 6, the bars 3–4 and 5 are of appropriate arcuate shape, while on the bars 3–4, in any suitable way, either before or after assembly of the panel with the motorbus body, a finishing plate or sheet of steel, polyester or a similar material has been mounted, said plate extending throughout the width of the panel and partially overlapping said edge bars.

On the side wall of both said edge bars 1-2, and on the upper wall of the bar 4 as well as the lower wall of the bar 5, as well known in the art, a continuous rubber frame 7 has been fixed, said rubber frame having a continuous groove 8 provided therein, said groove being intended to eventually receive the window pane 9 and to fix the latter on the panel; to this effect a continuous metal strip 10 has been welded on both edge bars 1-2, the upper edge of bar 4 and the lower edge of bar 5, said strip ensuring the fixation of said rubber frame on said panel.

As an additional measure, particularly in the case of a front panel normally adjacent to an access door, a gutter or water collecting channel 11 and a shaped rubber gasket 12 may be provided, the latter being fixed on the end wall of the respective edge bar 1 or 2 by means of a Z-shaped metal strip 13.

Figure 9:
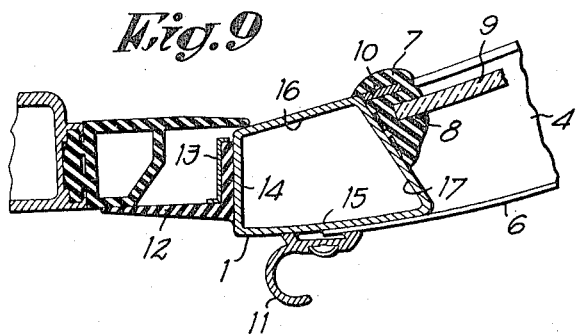
FIG. 9 shows, at an enlarged scale, the part indicated by F9 in FIG. 8.
Figure 8:
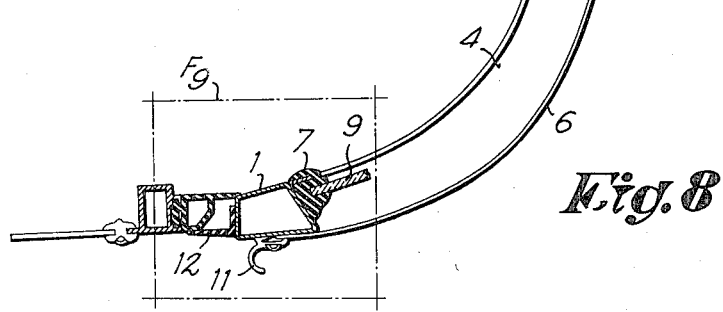
FIG. 8 is a sectional view according to the line VIII—VIII in FIG. 1.

As appears more particularly from FIG. 9, the edge bar 1–2 is a shaped metal bar having a hollow section, obtained either by drawing or by welding, with walls 14–15–16 and 17, of which the wall 14 is approximately at right angles with respect to the longitudinal axis of the vehicle, whereas the slightly diverging walls 15 and 16 connect said wall 14 with the oblique wall 17, the latter being at an angle of 90° or less with respect to the tangent to the corresponding end of the glass pane 9.

Figure 1:
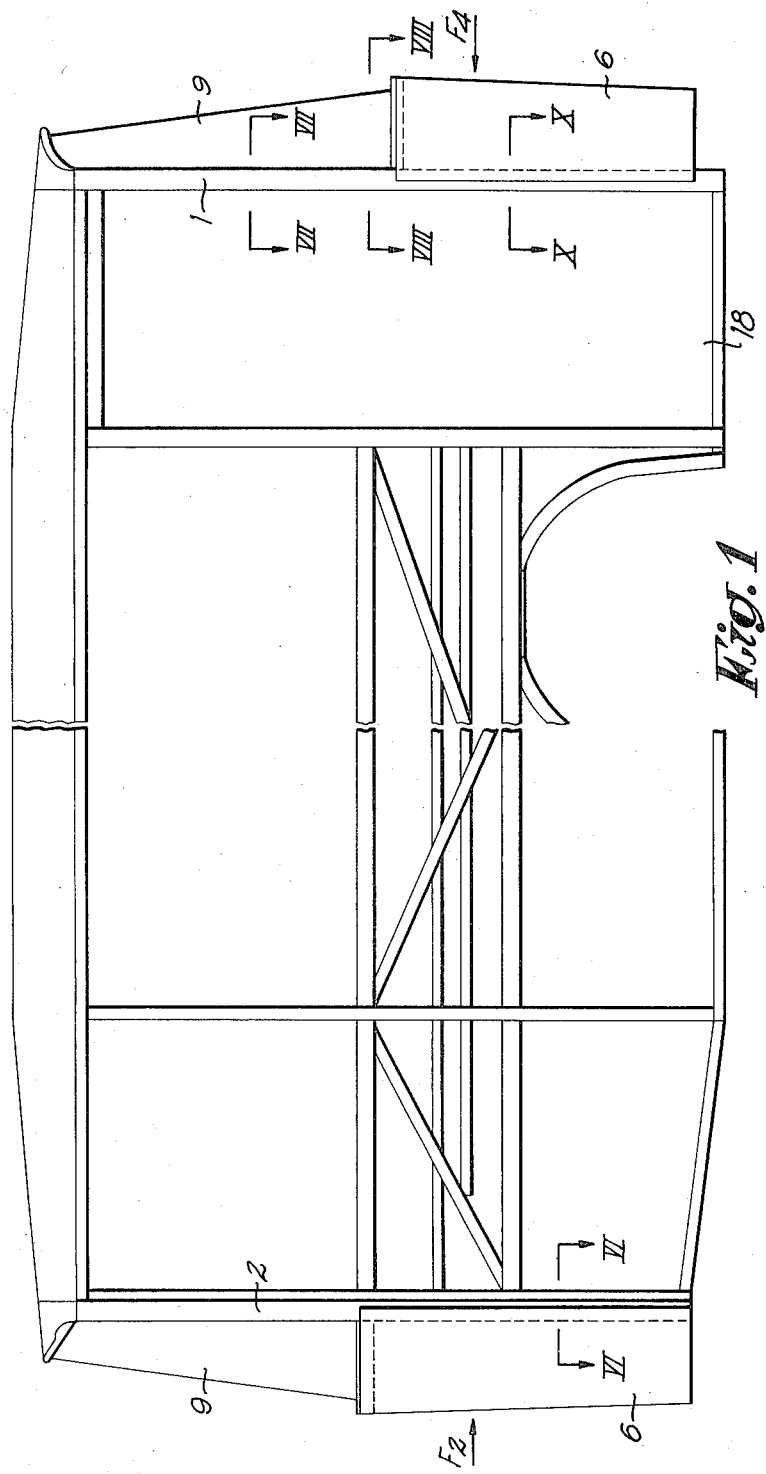
FIG. 1 shows a partial lateral view of a motorbus body, with a front and a back panel according to the invention, mounted thereon.
Figure 2:
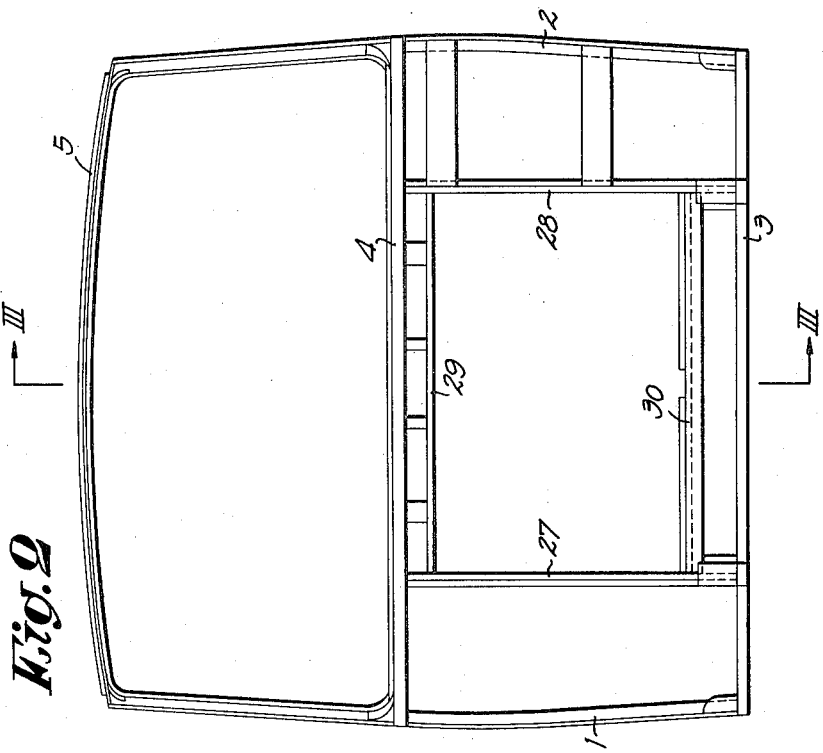
FIG. 2 is a view according to the arrow F2 in FIG. 1, of the front panel of the motorbus, the facing being removed.

In the case of a front panel said edge bar 1 or 2 forms at the same time the rabbet for the adjacent door mounted in the space indicated at 18 in FIG. 1, said edge bars being attached to the motorbus body only at their upper and lower ends, as well as by means of the transversal bars, which may be provided at any level, but at least at the levels of the upper and lower edges of the panel.

In the case of a back door or a back panel, or in case no door is provided in an adjacent position, the respective edge bar of the panel will be attached, throughout its length, to an adjacent upright forming part of the motorbus body.

Figure 4:
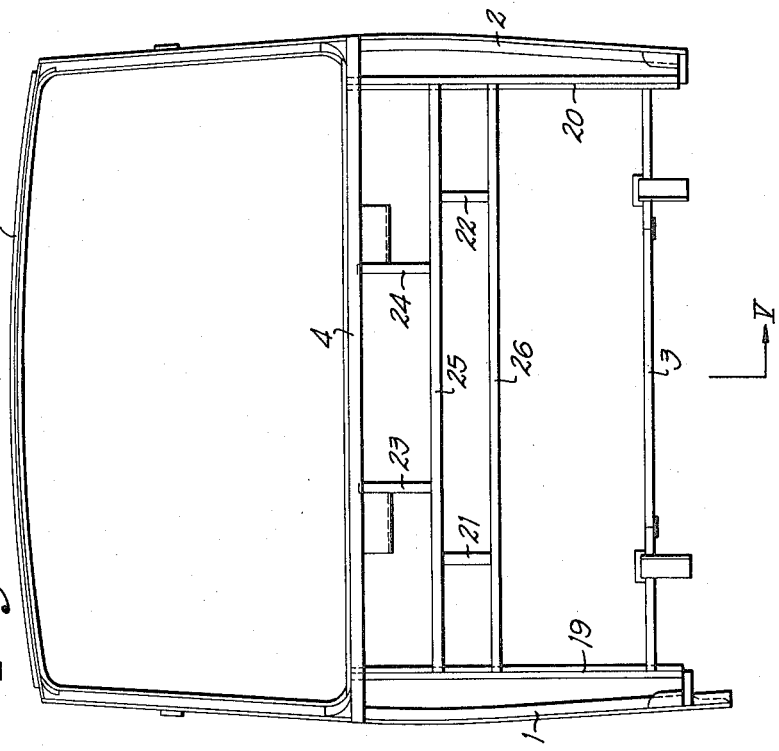
FIG. 4 is a view, according to the arrow F4 in FIG. 1, of the back panel of the motorbus, the facing being removed.

As appears more particularly from FIG. 4, the front panel is moreover provided with intermediate uprights such as 19–20–21–22–23–24 and with intermediate transverse bars 25–26, as well as fixtures for the mounting of lights, bumpers etc., whereas the back panel has intermediate uprights 27–28 and transversal bars 29–30, as well as fixtures for the mounting of lights, bumpers, etc.

Front and/or back panels such as described hereinbefore may be mass-manufactured separately, whereafter they need only be fitted and secured, generally by welding, to the corresponding part of the motorbus body, so as to achieve the complete assembly thereof.

Thus considerable simplification is achieved not only of the manufacture, but also the assembly of motorbus bodies, thus enabling such operations to be accelerated, so that the whole process of manufacturing and assembly can be achieved in a shorter time.

Owing to the fact that the panels are beforehand provided with openings and fixtures for the mounting of lighting and signalling units and similar accessories, the finishing operations will also take less time.

Owing to the use of special terminal bracing bars 1–2, said front and back panels present in themselves sufficient strength and rigidity in order to withstand handling before they have been mounted, and to ensure, after mounting, excellent solidity of the motorbus body, moreover this permits using such a panel adjacent to an access door, as said edge bar is of sufficient rigidity to be able to act as a door-post. Finally the shape of said bars 1–2, more particularly the oblique position of the inner walls 17 thereof, is such as to permit a certain play of the glass pane 9 with respect to the panel, without any danger of loosening or detachment thereof.

The present invention is by no means limited to the embodiment herein described by way of an example and illustrated in the accompanying drawings; such panels can be realized in many different shapes and sizes without departing from the scope of the invention.

What I claim is:

1. End panel, for a motorbus with side panels limited by vertical uprights, including an arcuate framework limited by vertical uprights adapted to be secured to the vertical uprights of said side panels, said vertical uprights of the end panel each having a hollow trapezoidal cross-section with inner and outer side walls and with a short and a long base, said inner side wall is at right angles with respect to the longitudinal axis of said motorbus, at least one rubber strip fixed substantially in the angle between the prolongement of said short base and said inner side wall of each of said vertical uprights of said end panel, said rubber strip having a peripheral groove, and a glass pane edges of which are fixed in the peripheral grooves of said rubber strip.

2. End panel according to claim 1, wherein said inner and outer side walls and said short base are flat, whereas said long base is arcuate in keeping with the local curvature of the end panel.

* * * * *